United States Patent
Hansen et al.

(10) Patent No.: US 10,427,779 B2
(45) Date of Patent: Oct. 1, 2019

(54) AIRCRAFT WING WITH AN ADAPTIVE SHOCK CONTROL BUMP

(71) Applicants: Airbus Defence and Space GmbH, Taufkirchen (DE); Airbus Operations GmbH, Hamburg (DE)

(72) Inventors: Heinz Hansen, Hamburg (DE); Johannes Kirn, Munich (DE); Wolfgang Machunze, Oberhaching (DE); Christian Metzner, Munich (DE); Markus J. Weber, Hamburg (DE)

(73) Assignees: Airbus Defence and Space GmbH (DE); Airbus Operations GmbH (DE)

( * ) Notice: Subject to any disclaimer, the term of this patent is extended or adjusted under 35 U.S.C. 154(b) by 393 days.

(21) Appl. No.: 15/384,520

(22) Filed: Dec. 20, 2016

(65) Prior Publication Data
US 2017/0190411 A1    Jul. 6, 2017

(30) Foreign Application Priority Data
Dec. 30, 2015   (DE) .................................. 15 203 195

(51) Int. Cl.
*B64C 3/58*   (2006.01)
*B64C 3/48*   (2006.01)
(Continued)

(52) U.S. Cl.
CPC .................. *B64C 3/58* (2013.01); *B64C 3/14* (2013.01); *B64C 3/48* (2013.01); *B64C 13/16* (2013.01);
(Continued)

(58) Field of Classification Search
CPC .... B64C 3/44; B64C 3/48; B64C 3/58; B64C 3/14; B64C 3/52; B64C 21/00; B64C 23/04; Y02T 50/14; Y02T 50/16
See application file for complete search history.

(56) References Cited

U.S. PATENT DOCUMENTS

| | | | |
|---|---|---|---|
| 5,433,404 A | * | 7/1995 | Ashill ....................... B64C 3/44 244/200 |
| 5,918,834 A | | 7/1999 | Sommer et al. |

(Continued)

FOREIGN PATENT DOCUMENTS

WO   WO-2011098807 A1 * 8/2011 ............. B64C 23/04

OTHER PUBLICATIONS

EP 15203195.1 Search Report dated Jun. 8, 2016.

*Primary Examiner* — Benjamin P Lee
(74) *Attorney, Agent, or Firm* — Lerner, David, Littenberg, Krumholz & Mentlik, LLP

(57) ABSTRACT

An aircraft wing has an upper surface element and a first actuator powered mechanism for varying the shape of the surface element which includes: an upstream segment $SEG_1$, a downstream segment $SEG_2$, an interconnecting segment $SEG_3$ interconnecting a downstream edge of $SEG_1$ with an upstream edge of $SEG_2$, wherein the interconnecting segment $SEG_3$ extends along the whole or at least a major part of the downstream edge of $SEG_1$ and the whole or at least a major part of the upstream edge of $SEG_2$, and a link element LNK interconnecting an upstream edge of $SEG_1$ with an upper surface of the aircraft wing, and the first mechanism interconnecting a contact C1 on a lower side of the upper surface element with a contact C2 on an inner structure of the airfoil. The first mechanism controls the shape of the upper surface element by controlling the distance between C1 and C2.

18 Claims, 1 Drawing Sheet

(51) Int. Cl.
 *B64C 13/16* (2006.01)
 *B64C 3/14* (2006.01)
 *B64C 23/04* (2006.01)

(52) U.S. Cl.
 CPC ........ *B64C 23/04* (2013.01); *B64C 2003/148* (2013.01)

(56) References Cited

U.S. PATENT DOCUMENTS

| | | |
|---|---|---|
| 6,209,824 B1 | 4/2001 | Caton et al. |
| 6,994,297 B1 * | 2/2006 | Hassan .................... B64C 9/38 244/204 |
| 8,016,245 B2 * | 9/2011 | Hassan .................. B64C 23/04 244/1 N |
| 8,887,482 B1 * | 11/2014 | Ruggeri .................... F02K 1/82 431/1 |
| 2006/0060720 A1 | 3/2006 | Bogue |
| 2009/0084906 A1 * | 4/2009 | Hassan .................. B64C 23/04 244/208 |
| 2010/0301172 A1 * | 12/2010 | Wood ..................... B64C 23/04 244/200 |
| 2016/0031546 A1 * | 2/2016 | Rolston .................... B64C 3/58 244/213 |

* cited by examiner

AIRCRAFT WING WITH AN ADAPTIVE SHOCK CONTROL BUMP

FIELD OF THE INVENTION

The invention relates to an aircraft wing with an upper surface element and a first actuator powered mechanism for varying the shape of the upper surface element, wherein the upper surface element acting as adaptive "shock control bump".

BACKGROUND OF THE INVENTION

It is known that so-called "shock control bumps" (SCB's) are useful to reduce the characteristic impedance of an aircraft wing. Shock control bumps are a relatively new class of flow control devices that offer a number of potential performance benefits for (transonic or supersonic) applications where shock waves are present. They have most commonly been considered as a means for improving the performance of transonic wings, through the manipulation of the air flow over the upper wing surface where near-normal shockwave exists, resulting in a reduced characteristic impedance of the aircraft wing and an improved buffeting behaviour.

As the name suggests, conventional SCB's consist of a physical bump placed on the aerodynamic surface where shockwave is known to occur. By far the most common application considered is the upper surface of a transonic wing. In this application SCBs can have a beneficial smearing effect on the structure of the near normal shockwave close to the wing surface. Specifically, SCB's split the shock into a number of weaker (oblique) shocks or compression waves that decelerate the flow more gradually (and hence more isentropically) than the single uncontrolled shockwave, thus incurring a reduced stagnation pressure loss and lower drag. A typical SCB consists of a ramp upstream of the nominal shock location, followed by a short crest region and then a tail. The ramp generates an oblique shock (or multiple oblique compression waves) and the main shockwave which deflects the incoming supersonic flow away from the surface. Around the crest region, the flow is decelerated to subsonic velocities by a near-normal shockwave, before the tail brings the post-shock flow back to the aircraft wing surface.

BRIEF SUMMARY OF THE INVENTION

There may be a need to provide an aircraft wing with an adaptive shock control bump allowing an improvement of the performance of the aircraft wing and which especially contributes to an improvement of the buffeting behaviour and a reduction of the characteristic impedance of the aircraft wing.

A first aspect provides an aircraft wing with an upper surface element and a first actuator powered mechanism for varying the shape of the upper surface element, wherein the surface element comprising: an upstream segment $SEG_1$ with a stiffness $S_1$, a downstream segment $SEG_2$ with a stiffness $S_2$, an interconnecting segment $SEG_3$ with a stiffness $S_3$, the interconnecting segment $SEG_3$ is interconnecting a downstream edge of $SEG_1$ with an upstream edge of $SEG_2$, wherein the interconnecting segment $SEG_3$ is extending along the whole downstream edge of $SEG_1$ and the whole upstream edge of $SEG_2$, or at least along a major part of the downstream edge of $SEG_1$ and a major part of the upstream edge of $SEG_2$, and the interconnecting segment $SEG_3$ exhibits a mechanical pretension causing a convex shape of the upper surface element (especially if no forces acting to the upper surface element), with: $S_3 < S_1, S_2$.

The surface element further comprises a link element LNK, the link element LNK is interconnecting an upstream edge of the upstream segment $SEG_1$ with an upper surface of the aircraft wing.

Further, the first actuator powered mechanism interconnects a contact C1 on a lower side of the upper surface element with a contact C2 on an inner structure of the aircraft wing, wherein the first actuator powered mechanism controls the shape of the upper surface element by controlling the distance between C1 and C2.

The terms "upstream" and "downstream" refer to a main flow direction across the aircraft wing when airborne. Right and left edges of the upper surface element are the edges of the upper surface element orientated perpendicular to the air flow direction across the aircraft wing. In a preferred embodiment the upper surface element has a rectangular shape from a top view.

The term "stiffness" refers to a structural (mechanical) stiffness of the respective segment or link element. In a preferred embodiment the segments $SEG_1$, $SEG_2$ are made of a metal, a metal alloy, a carbon fiber composite, a glass fiber composite or a mixture thereof. In a preferred embodiment the interconnecting segment $SEG_3$ and/or the link element LNK are made of a metal, a metal alloy, a carbon fiber composite, a glass fiber composite or a mixture thereof. In a preferred embodiment the stiffness of segments $SEG_1$ and/or $SEG_2$ are selected such that said segments are dimensionally stable at least under operational air loads on the upper surface element. In a preferred embodiment the stiffness of segment $SEG_3$ is selected such that, firstly based on the mechanical pretension a convex shape of the upper surface element is conserved if no forces, especially no air load (air forces) are acting on the upper surface element, and secondly that the interconnecting segment $SEG_3$ is resiliently flexible enough for allowing a variation of the shape of the upper surface element induced by the first actuator powered mechanism. In a preferred embodiment the stiffness $S_1$ equals the stiffness $S_2$: $S_1 = S_2$.

In a preferred embodiment the upper surface element is a spoiler, particularly a high lift spoiler. Beneficially the high lift spoiler providing at least an airflow separation and a flow gap control functionality.

In a preferred embodiment the upper surface element is located on the upper side of the aircraft wing at a position where a compression shockwave is located during flight.

In a preferred embodiment the aircraft wing comprises more than one of said upper surface elements.

In a preferred embodiment the whole upper surface element acts as shock control bump variable in shape. In a preferred embodiment the bump height BH, which is defined as the elevation of the upper surface element above the surrounding upper surface of the aircraft wing, is controlled by the first actuator powered mechanism between 0 and a given maximum bump height $MAX_{BH}$: $BH \in [0, MAX_{BH}]$. In a preferred embodiment the upper surface element is manufactured with a maximum bump height mainly generated by the mechanical pretension of segment $SEG_3$. In a preferred embodiment the maximum bump height is available in a status where no forces are applied to the upper surface element, either from air loads or from the first actuator powered mechanism. In a preferred embodiment the status defined by BH=0 indicates that the upper surface element has a flat shaped cross-section, thus the aircraft wing in this case comprises no shock control bump.

Based on the adaptive/controllable shape of the upper surface element, it is possible to reduce the shockwave intensity depending on respective flow velocities (e.g. airspeeds, Mach numbers) resulting in a reduced characteristic impedance of the aircraft wing and a reduced fuel burn of the respective aircraft. The shape of the upper surface element (=: shape of the shock control bump) further controls the position of the shockwave on the upper surface element and thus reduces the danger of buffeting considerably. The pretension of the segment $SEG_3$ allows an integration of the upper surface element with adaptive shape (=adaptive shock control bump) into an aircraft wing with only minimal additional weight.

A preferred embodiment of the aircraft wing is characterized in that the link element LNK comprises one or mores hinges. The hinges are made of a metal, a metal alloy, a carbon fiber composite, a glass fiber composite or a mixture thereof. The hinges are inherently stable and allow a deflection of the upper surface element about a hinge axis.

In a preferred alternative embodiment of the aircraft wing the link element LNK is realized as a strip made of a resiliently flexible material with a stiffness $S_4$, wherein a downstream edge of the strip is connected to and is extending along the whole upstream edge of $SEG_1$ or at least along a major part of the upstream edge of $SEG_1$, and a whole upstream edge of the strip is connected to the upper surface of the aircraft wing. In a preferred embodiment the stiffness $S_3$ equals the stiffness $S_4$: $S_3=S_4$.

In a preferred embodiment the upper surface element is connected to the aircraft wing exclusively via the link element LNK and the first actuator powered mechanism. All other parts of the upper surface element in this embodiment are not connected to the aircraft wing but may for example freely/movably rest on an ambient upper surface of the aircraft wing. The ambient upper surface and the first actuator powered mechanism inducing bending forces on the upper surface element.

A preferred embodiment of the aircraft wing is characterized in that a downstream edge of segment $SEG_2$ is resting freely on a successive upper surface of the aircraft wing or on a surface attached to the airfoil (e.g. a trailing edge flap). Another preferred embodiment of the aircraft wing is characterized in that side edges (right and/or left edges) of the upper surface element are resting freely on a successive upper surface of the aircraft wing. The mechanical support of the side edges and/or the mechanical support of the downstream edge of the upper surface element by a successive upper surface of the aircraft wing contributing to the shape variation by inducing bending forces on the upper surface element while controlling the distance between C1 and C2.

A preferred embodiment of the aircraft wing is characterized in that a second actuator powered mechanism is interconnecting a connection C3 on a lower side of segment $SEG_1$ and a connection C4 on a lower side of segment $SEG_2$, wherein the second actuator powered mechanism controls a distance between connections C3 and C4. Controlling the distance between connections C3 and C4 directly controls the bending of the segment $SEG_3$ and thus controls the shape of the upper surface element. The second actuator powered mechanism may therefore support the first actuator powered mechanism in controlling the shape of the upper surface element of the aircraft wing. In case the upper surface element is a spoiler, the first actuator powered mechanism may operationally also be used for deflecting the spoiler from the reference angle to a target deflection angle, whereas the second actuator powered mechanism may be used to control the shape of the upper surface element. The second actuator powered mechanism may also be used for fine-tuning the shape of the upper surface element predominantly controlled by the first actuator powered mechanism.

A preferred embodiment of the aircraft wing is characterized in that the downstream segment $SEG_2$ itself is consisting of an upstream segment $SEG_1{}^*$ with a stiffness $S_1$, a downstream segment $SEG_2{}^*$ with a stiffness $S_2$, an interconnecting segment $SEG_3{}^*$ with a stiffness $S_3$. The interconnecting segment $SEG_3{}^*$ is interconnecting a downstream edge of $SEG_1{}^*$ with an upstream edge of $SEG_2{}^*$, wherein the interconnecting segment $SEG_3{}^*$ is extending along the whole downstream edge of $SEG_1{}^*$ and the whole upstream edge of $SEG_2{}^*$, or at least along a major part of the downstream edge of $SEG_1{}^*$ and a major part of the upstream edge of $SEG_2{}^*$, and the interconnecting segment $SEG_3{}^*$ exhibits a mechanical pretension causing a convex shape of the upper surface element if no forces acting to the upper surface element, with: $S_3<S_1, S_2$.

In a preferred embodiment a third actuator powered mechanism is interconnecting a connection C5 on a lower side of segment $SEG_1{}^*$ and a connection C6 on a lower side of segment $SEG_2{}^*$, wherein the third actuator powered mechanism controls a distance between connections C5 and C6. This embodiment allows a higher degree shape variations of the upper surface element leading to an even better reduction of the shockwave intensity and resulting in an even better reduced characteristic impedance of the aircraft wing and a reduced fuel burn of the respective aircraft.

A preferred embodiment of the aircraft wing is characterized in that the aircraft wing comprises a unit controlling an actuator of the first actuator powered mechanism and/or an actuator of the second actuator powered mechanism and/or an actuator of the third actuator powered mechanism depending on an actual airspeed or Mach number. The unit is preferably linked to an air data computer (ADC) of the respective aircraft for receiving the actual airspeed or Mach number input. The unit is driving the respective actuators beneficially based on the actual airspeed or Mach number input and based on given or calculated optimum shape data of the upper surface element.

A second aspect provides an aircraft with an aircraft wing as described before.

DETAILED DESCRIPTION

Figure 1:
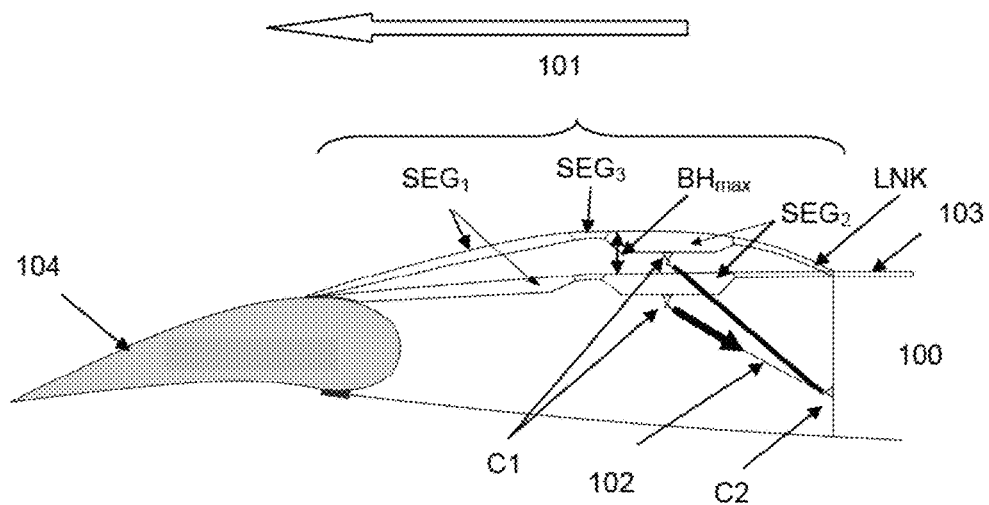
FIG. 1 is a simplified cross-section of a part of an aircraft wing with an upper surface element driven by a first actuator powered mechanism.

FIG. 1 illustrates a simplified cross-section of a part of an aircraft wing 100 with an upper surface element 101 driven by a first actuator powered mechanism 102. The upper surface element 101 represents a high lift spoiler of the aircraft wing 100.

The upper surface element 101 comprises an upstream segment $SEG_1$ with a stiffness $S_1$, a downstream segment $SEG_2$ with a stiffness $S_2$, an interconnecting segment $SEG_3$ with a stiffness $S_3$, with: $S_3<S_1, S_2$ and $S_1=S_2$. A main air flow direction is indicated by the prominent arrows in FIG. 1 and FIG. 2. The terms downstream/upstream referring to the main air flow direction.

The interconnecting segment $SEG_3$ interconnects a downstream edge of $SEG_1$ with an upstream edge of $SEG_2$, wherein the interconnecting segment $SEG_3$ extends along the whole downstream edge of $SEG_1$ and the whole upstream edge of $SEG_2$. The interconnecting segment $SEG_3$ further exhibits a mechanical pretension causing a convex shape of the upper surface element if no forces acting to the upper surface element.

A link element LNK interconnects an upstream edge of $SEG_1$ with an upper surface 103 of the aircraft wing. The link element LNK is realized as a strip made of a resiliently flexible material, wherein a downstream edge of the strip extends along the whole upstream edge of $SEG_1$ and a whole upstream edge of the strip is connected with the upper surface of the aircraft wing 100. The link element LNK also exhibits a mechanical pretension contributing to the convex shape of the upper surface element if no forces acting to the upper surface element.

The first actuator powered mechanism 102 interconnects a contact C1 on a lower side of the upper surface element 101 with a contact C2 on an inner structure of the aircraft wing, wherein the first actuator powered mechanism 102 controls the shape of the upper surface element 101 by controlling the distance between C1 and C2 while a downstream edge of segment $SEG_2$ rests freely on a successive upper surface 103 of an attached trailing edge flap 105 connected to the aircraft wing 100. The right and left side edges of the upper surface element 101 rest freely on a successive upper surface of the aircraft wing.

FIG. 1 shows the upper surface element 101 in a reference status with a maximum bump height $BH_{max}$ and the second status where the bump height is zero BH=0. The second status is reached by reducing the distance between points C1 and C2 from a reference distance in the reference status. While reducing the distance the first actuator powered mechanism 102 generates a force pulling the point C1 towards the point C2 (indicated by a black arrow). Controlling the distance between the point C1 and C2 directly affects the cross-section of the upper surface element 101 and the related bump height of the respective shock control bump.

Figure 2:
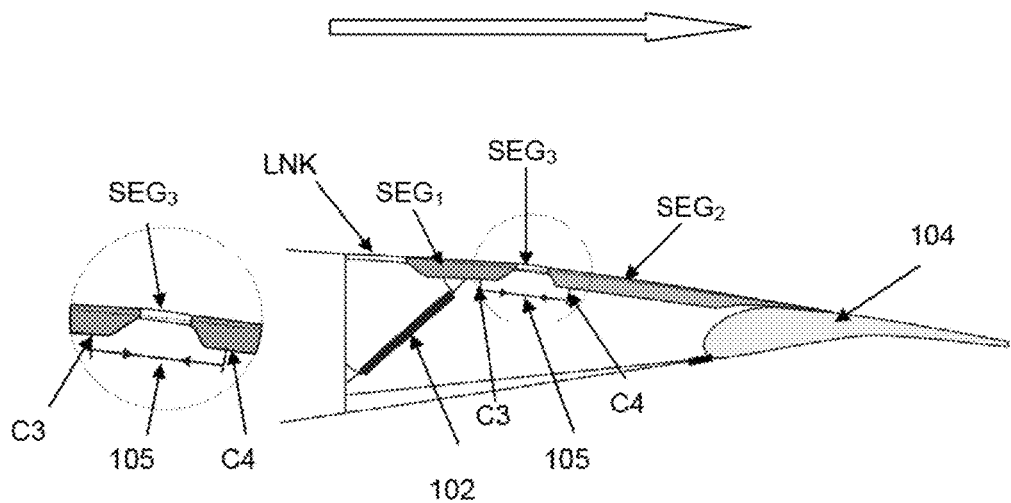
FIG. 2 is a simplified cross-section of a part of an aircraft wing with an upper surface element driven by a first and a second actuator powered mechanism.

FIG. 2 illustrates a simplified cross-section of a part of an aircraft wing with an upper surface element 101 driven by a first 102 and a second 105 actuator powered mechanism. In addition to the features illustrated in FIG. 1 the second actuator powered mechanism 105 interconnects a connection C3 on a lower side of segment $SEG_1$ and a connection C4 on a lower side of segment $SEG_2$, wherein the second actuator powered mechanism 105 controls a distance between connections C3 and C4. The second actuator powered mechanism 105 is used for fine-tuning the shape of the cross-section of the upper surface element 101 (e.g. the shape of the shock control bump).

The aircraft wing 100 further comprises a unit (not shown) controlling an actuator of the first actuator powered mechanism 102 and an actuator of the second actuator powered mechanism 105 depending on an actual airspeed or Mach number.

LIST OF REFERENCE SIGNS 100 aircraft wing
101 upper surface element
102 first actuator powered mechanism
103 upper surface of the aircraft wing
104 trailing edge flap
105 second actuator powered mechanism While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft wing with an upper surface element and a first actuator powered mechanism for varying the shape of the upper surface element, wherein the surface element comprises:
    an upstream segment $SEG_1$ with a stiffness $S_1$;
    a downstream segment $SEG_2$ with a stiffness $S_2$;
    an interconnecting segment $SEG_3$ with a stiffness $S_3$, the interconnecting segment $SEG_3$ interconnecting a downstream edge of $SEG_1$ with an upstream edge of $SEG_2$, wherein the interconnecting segment $SEG_3$ extends along the whole downstream edge of $SEG_1$ and the whole upstream edge of $SEG_2$, or at least along a major part of the downstream edge of $SEG_1$ and a major part of the upstream edge of $SEG_2$, and the interconnecting segment $SEG_3$ exhibits a mechanical pretension causing a convex shape of the upper surface element, with: $S_3 < S_1, S_2$; and
    a link element LNK, the link element LNK interconnecting an upstream edge of $SEG_1$ with an upper surface of the aircraft wing;
    wherein the first actuator powered mechanism interconnects a contact C1 on a lower side of the upper surface element with a contact C2 on an inner structure of the aircraft wing,
    wherein the first actuator powered mechanism controls the shape of the upper surface element by controlling the distance between C1 and C2, and
    wherein the downstream segment $SEG_2$ comprises:
    an upstream segment $SEG_1^*$ with a stiffness $S_1$;
    a downstream segment $SEG_2^*$ with a stiffness $S_2$; and
    an interconnecting segment $SEG_3^*$ with a stiffness $S_3$, the interconnecting segment $SEG_3^*$ interconnecting a downstream edge of $SEG_1^*$ with an upstream edge of $SEG_2^*$, wherein the interconnecting segment $SEG_3^*$ extends along the whole downstream edge of $SEG_1^*$ and the whole upstream edge of $SEG_2^*$, or at least along a major part of the downstream edge of $SEG_1^*$ and a major part of the upstream edge of $SEG_2^*$, and the interconnecting segment $SEG_3^*$ exhibits a mechanical pretension causing a convex shape of the upper surface element, with: $S_3 < S_1, S_2$.

2. The aircraft wing of claim 1, wherein the link element LNK comprises one or more hinges.

3. The aircraft wing of claim 1, wherein the link element LNK comprises a strip made of a resiliently flexible material, wherein a downstream edge of the strip extends along the whole upstream edge of $SEG_1$ or at least along a major part of the upstream edge of $SEG_1$, and a whole upstream edge of the strip is connected with the upper surface of the aircraft wing.

4. The aircraft wing of claim 1, wherein the upper surface element is connected to the aircraft wing exclusively via the link element LNK and the first actuator powered mechanism.

5. The aircraft wing of claim 1, wherein a downstream edge of segment $SEG_2$ rests freely on a successive upper surface of the aircraft wing or on a surface attached to the aircraft wing.

6. The aircraft wing of claim 1, wherein side edges of the upper surface element rest freely on a successive upper surface of the aircraft wing.

7. The aircraft wing of claim 1, wherein the stiffness $S_1$ equals stiffness $S_2$: $S_1=S_2$.

8. The aircraft wing of claim 1, wherein the link element LNK comprises a strip made of a resiliently flexible material with a stiffness $S_4$ and
wherein the stiffness $S_3$ equals stiffness $S_4$: $S_3=S_4$.

9. The aircraft wing of claim 1, wherein a second actuator powered mechanism interconnects a connection C3 on a lower side of segment $SEG_1$ and a connection C4 on a lower side of segment $SEG_2$, wherein the second actuator powered mechanism controls a distance between connections C3 and C4.

10. The aircraft wing of claim 9, wherein the aircraft wing comprises a unit controlling at least one of an actuator of the first actuator powered mechanism and an actuator of the second actuator powered mechanism depending on an actual airspeed or Mach number.

11. The aircraft wing of claim 1, wherein the upper surface element is a spoiler.

12. An aircraft with an aircraft wing, wherein the aircraft wing comprises an upper surface element and a first actuator powered mechanism for varying the shape of the upper surface element, wherein
the surface element comprises:
an upstream segment $SEG_1$ with a stiffness $S_1$;
a downstream segment $SEG_2$ with a stiffness $S_2$;
an interconnecting segment $SEG_3$ with a stiffness $S_3$, the interconnecting segment $SEG_3$ interconnecting a downstream edge of $SEG_1$ with an upstream edge of $SEG_2$, wherein the interconnecting segment $SEG_3$ extends along the whole downstream edge of $SEG_1$ and the whole upstream edge of $SEG_2$, or at least along a major part of the downstream edge of $SEG_1$ and a major part of the upstream edge of $SEG_2$, and the interconnecting segment $SEG_3$ exhibits a mechanical pretension causing a convex shape of the upper surface element, with: $S_3<S_1, S_2$; and
a link element LNK, the link element LNK interconnecting an upstream edge of $SEG_1$ with an upper surface of the aircraft wing, and the first actuator powered mechanism interconnecting a contact C1 on a lower side of the upper surface element with a contact C2 on an inner structure of the aircraft wing, wherein the first actuator powered mechanism controls the shape of the upper surface element by controlling the distance between C1 and C2,
wherein a second actuator powered mechanism interconnects a connection C3 on a lower side of segment $SEG_1$ and a connection C4 on a lower side of segment $SEG_2$ wherein the second actuator powered mechanism controls a distance between connections C3 and C4, and
wherein the aircraft wing comprises a unit controlling at least one of an actuator of the first actuator powered mechanism and an actuator of the second actuator powered mechanism depending on an actual airspeed or Mach number.

13. The aircraft of claim 12, wherein the link element LNK comprises one or more hinges.

14. The aircraft of claim 12, wherein the downstream segment $SEG_2$ comprises:
an upstream segment $SEG_1^*$ with a stiffness $S_1$;
a downstream segment $SEG_2^*$ with a stiffness $S_2$; and
an interconnecting segment $SEG_3^*$ with a stiffness $S_3$, the interconnecting segment $SEG_3^*$ interconnecting a downstream edge of $SEG_1^*$ with an upstream edge of $SEG_2^*$, wherein the interconnecting segment $SEG_3^*$ extends along the whole downstream edge of $SEG_1^*$ and the whole upstream edge of $SEG_2^*$, or at least along a major part of the downstream edge of $SEG_1^*$ and a major part of the upstream edge of $SEG_2^*$, and the interconnecting segment $SEG_3^*$ exhibits a mechanical pretension causing a convex shape of the upper surface element, with: $S_3<S_1, S_2$.

15. The aircraft of claim 12, wherein the upper surface element is a spoiler.

16. The aircraft of claim 12, wherein the link element LNK comprises a strip made of a resiliently flexible material with a stiffness $S_4$, and wherein the stiffness $S_3$ equals stiffness $S_4$: $S_3=S_4$.

17. The aircraft of claim 12, wherein a downstream edge of segment $SEG_2$ rests freely on a successive upper surface of the aircraft wing or on a surface attached to the aircraft wing.

18. The aircraft of claim 12, wherein side edges of the upper surface element rest freely on a successive upper surface of the aircraft wing.

* * * * *